(12) United States Patent
Kaiser et al.

(10) Patent No.: US 7,407,349 B2
(45) Date of Patent: Aug. 5, 2008

(54) BORING TOOL

(75) Inventors: Heinz Kaiser, Wallisellen (CH); Ernst Hänggi, Neiderglatt (CH); Ralph Stadelmann, Niederweningen (CH)

(73) Assignee: Heinz Kaiser AG (CH)

( * ) Notice: Subject to any disclaimer, the term of this patent is extended or adjusted under 35 U.S.C. 154(b) by 180 days.

(21) Appl. No.: 11/182,969

(22) Filed: Jul. 15, 2005

(65) Prior Publication Data

US 2006/0013664 A1 Jan. 19, 2006

(30) Foreign Application Priority Data

Jul. 15, 2004 (CH) .................. 1194/04

(51) Int. Cl.
*B23B 29/04* (2006.01)
*B23B 29/34* (2006.01)

(52) U.S. Cl. .................. 408/180; 408/153; 279/5

(58) Field of Classification Search ............ 408/147, 408/151, 155, 159, 179, 181, 185, 187, 153, 408/180; 279/5, 9.1
See application file for complete search history.

(56) References Cited

U.S. PATENT DOCUMENTS

| | | | | | |
|---|---|---|---|---|---|
| 1,493,051 | A | * | 5/1924 | O'Brien | 407/83 |
| 2,369,875 | A | * | 2/1945 | Wanelik | 403/161 |
| 2,483,096 | A | * | 9/1949 | Jaworowski et al. | 279/5 |
| 2,654,610 | A | * | 10/1953 | De Vlieg | 279/6 |
| 3,044,322 | A | * | 7/1962 | George | 408/16 |
| 3,044,323 | A | * | 7/1962 | Sweeny | 408/151 |
| 3,148,561 | A | * | 9/1964 | Krampert | 408/181 |
| 3,542,528 | A | * | 11/1970 | Bech | 407/37 |
| 3,686,728 | A | * | 8/1972 | Fried | 407/44 |
| 3,704,958 | A | * | 12/1972 | Gulibon et al. | 408/153 |
| 3,753,624 | A | * | 8/1973 | Walker et al. | 408/159 |
| 3,765,788 | A | * | 10/1973 | Gulibon et al. | 408/181 |
| 3,813,970 | A | * | 6/1974 | Mitchell | 82/158 |
| 4,398,854 | A | * | 8/1983 | Pape et al. | 408/185 |
| 4,516,889 | A | * | 5/1985 | Ortlieb | 408/152 |
| 4,582,457 | A | * | 4/1986 | Belttari | 408/159 |
| 4,626,144 | A | * | 12/1986 | Berner | 408/143 |
| 4,773,801 | A | * | 9/1988 | Noggle | 409/234 |
| 4,775,268 | A | * | 10/1988 | Michalon | 408/156 |

(Continued)

FOREIGN PATENT DOCUMENTS

CH 84483 3/1920

(Continued)

*Primary Examiner*—Monica S. Carter
*Assistant Examiner*—Michael W. Talbot
(74) *Attorney, Agent, or Firm*—Lerner, David, Littenberg, Krumholz & Mentlik, LLP

(57) ABSTRACT

The boring tool having a basic body (2) in which a tool bit (27) is arranged which has a cutting edge (29) at a front end (27b). The basic body (2) has an opening (3) in which the tool bit (27) is pivotably mounted. Setting means (7) serve to set the pivoted position of the tool bit (27) relative to the basic body (2). Means (16) serve to fix the tool bit (27) in the set pivoted position. The tool bit (27) is pivotable about a pivot point (P) which is essentially neutral in terms of unbalance. The tool bit (27) is preferably connected at a rear end (27a) to a radially adjustable slide (7). The slide (7) can be finely adjusted radially, for example with a micrometer screw (9).

10 Claims, 2 Drawing Sheets

U.S. PATENT DOCUMENTS

Figure 4:
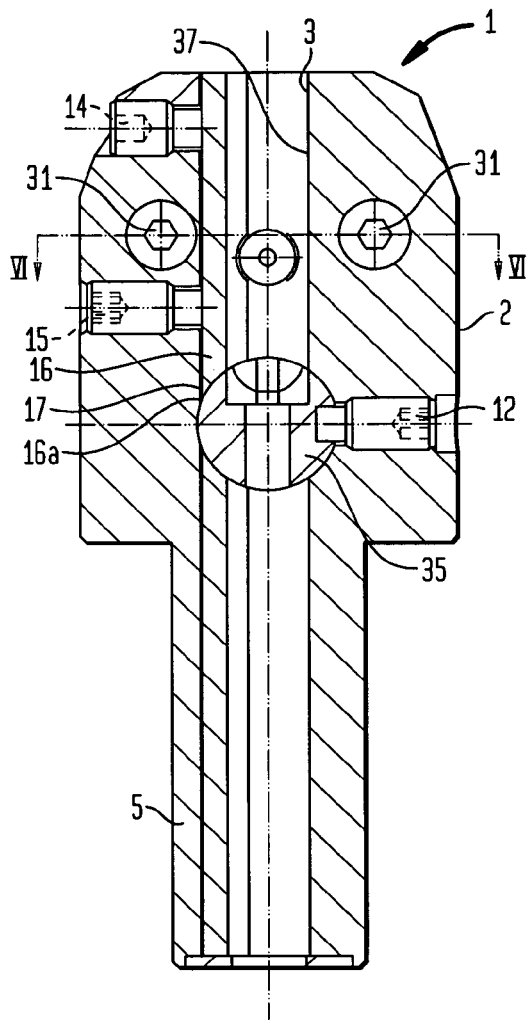

| | | | |
|---|---|---|---|
| 4,930,947 A * | 6/1990 | Jacobson | 408/153 |
| 4,955,767 A * | 9/1990 | Kaiser et al. | 408/146 |
| 4,979,852 A * | 12/1990 | Noggle | 408/156 |
| 5,116,194 A * | 5/1992 | Pfalzgraf et al. | 408/181 |
| 6,227,082 B1 * | 5/2001 | Hormansdorfer et al. | 82/1.11 |
| 6,354,179 B1 * | 3/2002 | Leuze | 82/160 |

FOREIGN PATENT DOCUMENTS

| | | | |
|---|---|---|---|
| CH | SU 84483 A * | 3/1920 | |
| FR | 2674159 A3 * | 9/1992 | |
| GB | 690366 | 4/1953 | |
| SU | 979025 A * | 12/1982 | |
| WO | WO-99/43453 | 9/1999 | |
| WO | WO-99/43459 A1 | 9/1999 | |
| WO | WO 9943459 A1 * | 9/1999 | |

* cited by examiner

FIG. 1
FIG. 2
FIG. 3
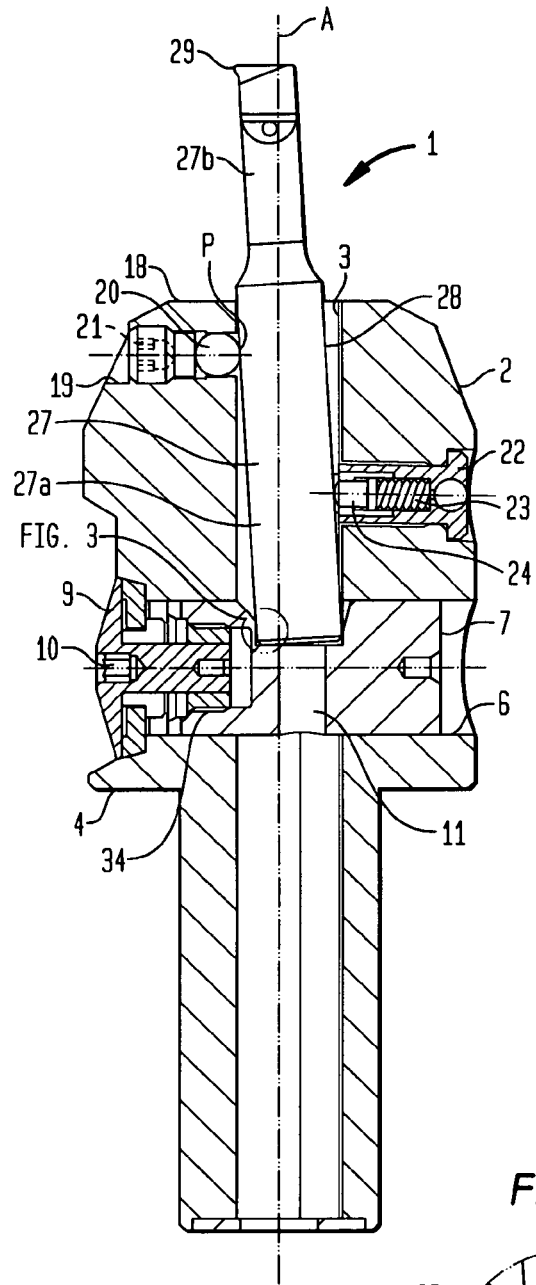
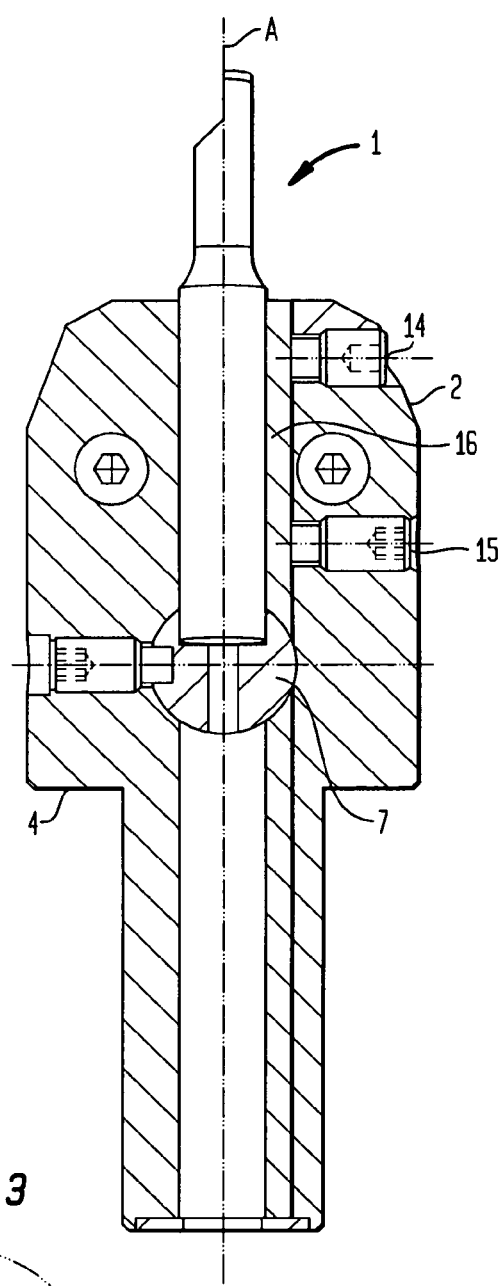
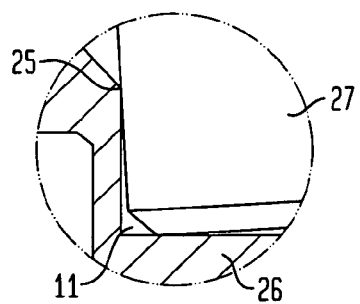

BORING TOOL

The invention relates to a boring tool having a basic body in which a tool bit with a cutting edge arranged at a front end is mounted, having an opening in the basic body, in which the tool body is pivotably mounted, having setting means for setting the pivoted position of the tool carrier about a bearing point relative to the basic body, and having means for fixing the tool carrier in the set pivoted position.

Boring tools of this type have been known, for example as cutting tools, for a long time. The machining diameter can be adjusted by pivoting the tool carrier.

Boring tools of said type have been disclosed, for example, by U.S. Pat. Nos. 1,493,051, 3,148,561, CH 84483 and WO 99/43459. In these documents, the tool bit is pivotable within a comparatively small angle about a radially running pivot axis at a rear end. For the pivoting, one screw is released and another one is readjusted in each case. During the adjustment, unbalance is produced, which has to be compensated for as far as possible by balancing weights. Such balancing is comparatively complicated. The adjustment is time-consuming and requires appropriate experience.

The object of the invention is to provide a boring tool of said type which avoids said disadvantages.

In a boring tool of the generic type, the object is achieved by the tool carrier being pivotable about a pivot point which is essentially neutral in terms of unbalance. In the boring tool according to the invention, the pivot point is thus arranged in such a way that essentially no additional unbalance is produced during said adjustment of the tool carrier.

The pivot point is therefore not located at the rear end of the tool carrier as hitherto but rather essentially between the front and the rear end of the rod-shaped tool carrier. The pivot point is preferably located on the lateral surface of the tool bit.

According to a development, provision is made for the tool bit to be connected at a rear end to an adjustable slide. The radial adjustment of the slide accordingly results in a radial displacement of mass. The pivot point is now preferably arranged in such a way that, during the use of comparatively long tool bits, the mass displacement of the slide is compensated for by the correspondingly pivoted tool bit. In this case, the pivot point is neutral in terms of unbalance even taking into account the mass of the slide.

According to a development of the invention, provision is made for the slide to be capable of being finely adjusted radially, for example with the aid of a micrometer screw, a vernier or the like. This permits a very precise and in addition simple setting of the diameter, in which case the slide can be adjusted with only one operating key. The accuracy of the micrometer spindle can be additionally enhanced by the attachment of a vernier. A substantial advantage of the invention permits the precise fine adjustment without additional aids such as dial gages or the like. For example, a rough-machined bore, after measuring with a micrometer or the like, can be adjusted by the required difference in an extremely precise manner by rotation at the micrometer spindle. The slide can be adjusted with a single tool, a vernier scale preferably being used here. Precise setting by the operator is also possible without considerable experience.

According to a development of the invention, provision is made for the slide to have a recess, into which the rear end of the tool bit projects. When being inserted into the opening of the basic body, the tool bit is inserted into this recess and is thus positioned.

According to a development of the invention, provision is made for a clamping part to be provided for fixing the tool bit, this clamping part clamping the slide at the same time. Especially high stability can thus be achieved.

Further advantageous features are given in the dependent claims, the following description, and the drawing.

Figure 5:
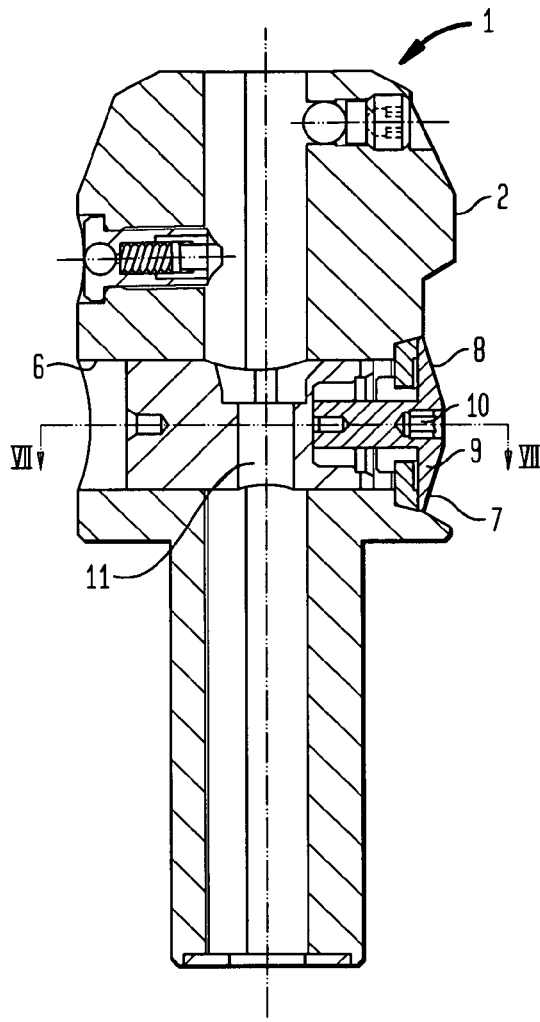
Figure 6:
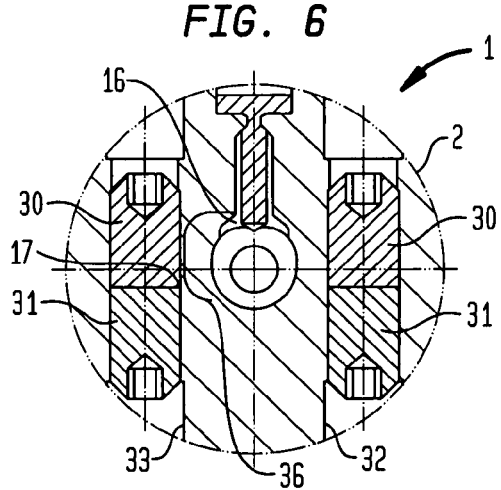
Figure 7:
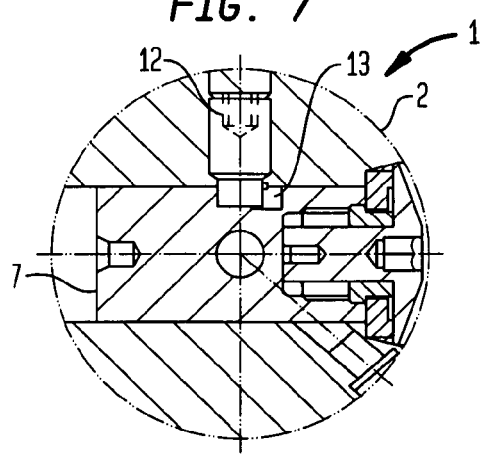

An exemplary embodiment of the invention is explained in more detail with reference to the drawing, in which FIG. 1 shows a longitudinal section through a boring tool according to the invention, FIG. 2 shows a further section through the boring tool according to the invention, FIG. 3 shows an enlarged region of the boring tool, FIG. 4 shows a section through the boring tool according to the invention, the tool bit not being shown, FIG. 5 shows a further section through the boring tool, the tool bit likewise being omitted here, FIG. 6 shows a cross section along line VI-VI in FIG. 4, and FIG. 7 shows a cross section along line VII-VII in FIG. 5.

The boring tool 1 has an essentially cylindrical basic body 2 which has a shank 5 and a shoulder 4 for connection to a spindle (not shown here). The basic body 2 has a through-opening 3 in which the axis A runs. Inserted into a radially running bore 6 is a slide 7 which can be radially adjusted in a precise manner. The adjustment is effected at a micrometer screw 9 or other setting means which are provided with a scale 8, in particular a vernier scale. This micrometer screw 9 is rotatably mounted on the basic body 2 and is connected to the slide 7 by a thread 34. When the micrometer screw 9 is rotated, the slide 7 is radially adjusted, which can be effected in a very precise manner on account of said scale. In order to rotate the setting part 9, it has a hexagon hole 10, into which a tool (not shown here) can be inserted. So that the slide 7 does not rotate about its own axis, a guide body 12 is inserted into the basic body 2 according to FIG. 4, this guide body 12 engaging in a groove 13 of the slide 7 according to FIG. 7.

Approximately centrally and at the top, the slide 7 has an essentially conical recess 11 in which a rear end of a tool bit 27 can engage. According to FIG. 3, this recess 11 has an edge 25 which, when tool bit 27 is inserted, is at a distance from a bottom surface 26 of the tool bit 27. The recess 11 is designed in such a way that the tool bit 27 is pivotable in this recess.

The basic body 2 has a front-end surface 18, beyond which the inserted tool bit 27 projects. Arranged at a comparatively short distance from this surface 18 is a ball 20 which is inserted into a radial hole 19 and which forms a pivot point P for the inserted tool bit 27, this pivot point P being neutral in terms of unbalance. The ball 20 is held with a headless set screw 21, which is screwed into the hole 19. As a result, the ball 20 is fixed radially. The pivot point P which is essentially neutral in terms of unbalance divides the tool bit 27 into a front region 27b and a rear region 27a. Depending on the tool bit 27, the front region 27b may be of varying length. At any rate, a cutting edge 29 is arranged on the front end and is formed in a conventional manner by an interchangeable cutting tip (not shown in any more detail here). The point P lies essentially approximately centrally between the surface 26 and the cutting edge 29. In comparatively short tool bits 27, however, the front region 27b is shorter than the rear region 27a. In especially long tool bits 27, the opposite may be the case. As can be seen, the ball 20 bears against the lateral surface 28 of the tool bit 27. The pivot point P is thus correspondingly formed on the lateral surface 28 of the tool bit 27.

So that the tool bit 27 can be pivoted about the point P, the opening 3 is of roughly oval design in cross section, as can be seen from FIG. 6. The larger diameter of the opening 3 is therefore larger than the diameter of the rear region 27a which projects into the opening 3. FIG. 1 shows the tool bit 27 in the one possible maximum pivoted position. If the body 25 is displaced to the left in FIG. 1 by rotating the setting part 9, the cutting edge 29 shifts to the left away from the axis A. At the same time, the rear region 27a shifts to the right. Since the front region 27b therefore shifts to the left in FIG. 1 and the rear region 27a shifts to the right, such pivoting is essentially neutral in terms of balance. In addition, if the tool bit 27 is longer than shown in FIG. 1, the mass of the slide 7 is compensated for. If fine balancing is required, this can be effected by displacing weight elements 30 and 31, which according to FIG. 6 are mounted in parallel and radially running tapped holes 32 and 33. These weight elements 30 and 31 arranged in pairs are locked, so that they are fixed in a position set once.

For fixing the set pivoted position of the tool bit 27, a clamping part 16 is provided which according to FIG. 4 extends essentially over the entire rear region 27a of the tool bit 27. The tool bit 27 is therefore clamped essentially in the entire region which lies in the opening 3. The clamping part 16 is produced from the basic body 2 by spark erosion by the dividing line 17 shown in FIG. 6 being formed in the basic body 2 from the opening 3. According to FIG. 6, the cutting line 17 is formed in such a way that the clamping part 16 remains connected to the basic body 2 in a region 36. The region 36 extending over the entire length of the clamping part 16 thus forms a type of hinge. The tool bit 27 is clamped by means of two clamping screws 14 and 15 which are arranged at a distance from one another and are shown in FIG. 4. A first clamping screw 14 is arranged at a comparatively short distance from the front side 18 and a second clamping screw 15 is arranged substantially closer to the slide 7. By the two clamping screws 14 and 15 being screwed in, the clamping part 16 is pressed against an opposite surface 37 of the basic body 2. At the same time, the clamping part 16 is pressed with a bottom end 16a against the body 35. This body 35 is additionally fixed by this clamping. If the tool bit 27 is fixed or clamped in the body 2, the body 35 is also clamped at the same time. The tool bit 27 is thus clamped over the entire rear region 27a and is additionally secured with its rear end in the recess 11. This results in especially high stability.

So that the tool bit 27 bears against the ball 20 when setting the pivoted position, a screw 22 is arranged in the basic body 2 at an opposite location and offset toward the slide 7, and mounted in this screw 22 at the front end is a pin 24 which bears against the tool bit 27 under the effect of a spring 23.

LIST OF DESIGNATIONS

1 Boring tool
2 Basic body
3 Opening
4 Shoulder
5 Shank
6 Bore
7 Slide
8 Scale (vernier)
9 Micrometer screw
10 Hexagon hole
11 Recess
12 Guide body
13 Groove
14 First clamping screw
15 Second clamping screw
16 Clamping part
16a Bottom end
17 Cutting line
18 Front-end surface
19 Hole
20 Ball
21 Headless set screw
22 Screw
23 Spring
24 Pin
25 Edge
26 Bottom surface
27 Tool bit
27a Rear region
27b Front region
28 Lateral surface
29 Cutting edge
30 Weight element
31 Weight element
32 Hole
33 Hole
34 Thread
35 Body
36 Region
37 Opposite surface
A Axis
P Pivot point

The invention claimed is:

1. A boring tool, comprising:
a rod-shaped tool bit comprising a front end and a rear end wherein the front end comprises a cutting edge;
a basic body comprising:
an opening defining a front end of the basic body in which the rod-shaped tool bit is pivotably mounted;
setting means comprising a radially adjustable slide in contact with the rear end of said rod-shaped tool bit for slidable movement for setting a pivoted position of the rod-shaped tool bit relative to the basic body; and
fixing means for fixing the rod-shaped tool bit in the set pivoted position, wherein the rod-shaped tool bit is pivotable by a radial displacement of the slide about a pivot point between the front and rear ends of the rod-shaped tool bit which is essentially neutral in terms of balance and wherein the pivot point is formed at a lateral surface of the rod-shaped tool bit.

2. The boring tool of claim 1, including a micrometer screw for finely adjusting the radial position of said setting means.

3. The boring tool of claim 2, wherein a sliding means includes a recess, from which the rear end of the rod-shaped tool bit projects.

4. The boring tool of claim 1, wherein the pivot point is at a substantially smaller distance from the front end of the basic body than from the rear end of the inserted rod-shaped tool bit.

5. The boring tool of claim 1, including a projection means projecting into said opening for defining the pivot point.

6. The boring tool of claim 5, wherein the projecting means comprises a ball.

7. The boring tool of claim 1, including a radially adjustable clamping part extending essentially over an entire depth of the opening for fixing the rod-shaped tool bit.

8. The boring tool of claim 7, wherein the adjustable clamping part is configured to also clamp the setting means.

9. The boring tool of claim 1, including a spring loaded pin for pressing the rod-shaped tool bit against said pivot point in a spring-loaded manner.

10. A boring tool, comprising:
a rod-shaped tool bit comprising a front end and a rear end wherein the front end comprises a cutting edge;
a basic body comprising:
an opening defining a front end of the basic body in which the rod-shaped tool bit is pivotably mounted;

setting means comprising a radially adjustable slide in contact with the rear end of said rod-shaped tool bit for slidable movement for setting a pivoted position of the rod-shaped tool bit relative to the basic body; and fixing means for fixing the rod-shaped tool bit in the set pivoted position, wherein the rod-shaped tool bit is pivotable by a radial displacement of the slide about a pivot point between the front and rear ends of the rod-shaped tool bit which is essentially neutral in terms of balance and wherein the pivot point is at a substantially smaller distance from the front end of the basic body than from the rear end of the inserted rod-shaped tool bit.

* * * * *

UNITED STATES PATENT AND TRADEMARK OFFICE
CERTIFICATE OF CORRECTION

PATENT NO. : 7,407,349 B2 Page 1 of 1
APPLICATION NO. : 11/182969
DATED : August 5, 2008
INVENTOR(S) : Heinz Kaiser, Ralph Stadelmann and Ernst Hänggi It is certified that error appears in the above-identified patent and that said Letters Patent is hereby corrected as shown below:

Column 2, line 55, before "surface", insert --bottom--.

Column 2, line 67, "25" should read --2--.

Column 3, line 28, "front side" should read --"front-end surface--.

Signed and Sealed this

Twentieth Day of October, 2009

David J. Kappos
*Director of the United States Patent and Trademark Office*